United States Patent [19]

Kubens

[11] 4,107,101

[45] Aug. 15, 1978

[54] PROCESS FOR THE PRODUCTION OF CROSSLINKED, URETHANE-CONTAINING PLASTICS

[75] Inventor: Rolf Kubens, Ordenthal-Hahnenberg, Germany

[73] Assignee: Bayer Aktiengesellschaft, Leverkusen, Germany

[21] Appl. No.: 582,970

[22] Filed: Jun. 2, 1975

[30] Foreign Application Priority Data

Jun. 5, 1974 [DE] Fed. Rep. of Germany ....... 2427089

[51] Int. Cl.$^2$ .............................................. C08G 18/28
[52] U.S. Cl. ................................. 521/137; 260/859 R
[58] Field of Search ............ 260/859, 2.5 AN, 40 TN

[56] References Cited

U.S. PATENT DOCUMENTS

| 3,008,917 | 11/1961 | Park et al. ....................... 260/40 TN |
| 3,824,201 | 7/1974 | McGranaghan et al. ... 260/859 R X |
| 3,860,537 | 1/1975 | Graham et al. ............. 260/859 R X |
| 3,886,229 | 5/1975 | Hutchinson et al. ............ 260/859 R |

FOREIGN PATENT DOCUMENTS 1,279,673  6/1972  United Kingdom.

Primary Examiner—Sandra M. Person

Attorney, Agent, or Firm—Gene Harsh; Joseph C. Gil; R. Brent Olson

[57] ABSTRACT

The instant invention relates to a process for the production of crosslinked plastics comprising reacting organic polyisocyanates, organic polyhydroxyl compounds and olefinically unsaturated monomers, optionally in the presence of catalysts and/or other auxiliaries and additives, wherein (a) the polyhydroxyl compounds used are olefinically unsaturated polyhydroxyl polyesters with OH-numbers in the range of from 200 to 1000, molecular weights in the range of from 200 to 800 and double bond contents of from 0.1 to 0.5 gram equivalents of C=C double bonds per 100 g of polyester;

(b) the olefinically unsaturated monomers used are olefinically unsaturated compounds with no more than one isocyanate-reactive group and boiling points in the range of from 40° to 250° C, the monomers being employed in such quantities that, for every olefinically unsaturated double bond in the polyhydroxyl compound (a) there are from 0.3 to 5 olefinically unsaturated double bonds emanating from the polymerizable monomers; and (c) the quantities in which the reactants are used are selected in such a way that there are from 0.3 to 5 isocyanate groups per hydroxyl group in the reaction mixture.

9 Claims, No Drawings

PROCESS FOR THE PRODUCTION OF CROSSLINKED, URETHANE-CONTAINING PLASTICS

BACKGROUND OF THE INVENTION

It is known that cellular plastics may be obtained from mixtures of unsaturated and saturated polyester resins, styrene, diisocyanates and organic peroxides (see, e.g. U.S. Pat. No. 2,642,403). The polyesters used are of high molecular weight and are either highly viscous or solid resins. The disadvantage of using resins of this type is that little or no filler may be used. The polyester resins used only contain small proportions of hydroxyl groups which only allow the formation of small proportions of urethane bonds in the cellular plastics. Accordingly, another disadvantage is the low crosslink density. The low crosslink density is responsible for the poor heat resistance and the inadequate resistance to chemicals and solvents of the cellular plastics.

Solutions containing polyhydroxy compounds, polyisocyanates and polymerizable vinyl compounds, as solvents, may also be used for the production of coatings, lacquers and bonds (see e.g. German Pat. No. 951,729). As disclosed in German Pat. No. 956,720, the same solvents are also recommended for the production of moldings, including foam moldings. The disadvantages referred to above apply fully to those applications. Another disadvantage of the solutions noted above is the fact that, in some cases, the polyhydroxy compounds are completely free from unsaturated compounds, with the result that the polymerizable vinyl compounds are unable to enter into any copolymerization reactions.

The use of conventional unsaturated polyesters, vinyl compounds and the addition of isocyanates has been described in German Pat. No. 963,019, and French Pat. Nos. 1,107,741 and 1,130,293. The disadvantages referred to above apply equally to these products.

It is also known that unsaturated polyesters may be reacted with isocyanates before copolymerization with vinyl compounds (see e.g. German Patent 895,529). The disadvantage of this process is that the urethane-modified polyesters have an even higher viscosity than conventional unsaturated polyester.

In another process for the production of foams from high molecular weight polyurethanes (German Pat. No. 945,479), unsaturated, linear or branched polyesters completely or predominantly containing terminal carboxyl groups and polymerizable vinyl or alkyl compounds are reacted with polyisocyanates in the presence of polymerization accelerators. One disadvantage of this process is that the polyesters containing terminal carboxyl groups are solid or highly viscous substances. Another disadvantage is the fact that it is only possible to produce foams by this process.

DESCRIPTION OF THE INVENTION

The present invention provides a new process for producing crosslinked plastics, in which the advantages of a low viscosity of the reaction mixture and the attendant possibility of using large quantities of filler, are optimally combined in a hitherto unknown manner with high mechanical strength which is reflected in particular in extremely high flexural strength and Martens values. One particular remarkable aspect of the process according to the present invention is the observation often made that the flexural strength of the end products increases rather than decreases where inert fillers are used.

The instant invention relates to a process for the production of crosslinked plastics comprising reacting organic polyisocyanates, organic polyhydroxyl compounds and olefinically unsaturated monomers, optionally in the presence of catalysts and/or other auxiliaries and additives, wherein:

(a) the polyhydroxyl compounds used are olefinically unsaturated polyhydroxyl polyesters with OH-numbers in the range of from 200 to 1000, molecular weights in the range of from 200 to 800 and double bond contents of from 0.1 to 0.5 gram equivalents of C=C double bonds per 100 g of polyester;

(b) the olefinically unsaturated monomers used are olefinically unsaturated compounds with no more than one isocyanate-reactive group and boiling points in the range of from 40° to 250° C, the monomers being employed in such quantities that, for every olefinically unsaturated double bond in the polyhydroxyl compound (a) there are from 0.3 to 5 olefinically unsaturated double bonds emanating from the polymerizable monomers; and (c) the quantities in which the reactants are used are selected in such a way that there are from 0.3 to 5 isocyanate groups per hydroxyl group in the reaction mixture.

The polyhydroxyl compounds (a) used in the process according to the invention are unsaturated polyhydroxy polyesters with an OH-number in the range of from 200 to 1000, preferably from 300 to 600, a molecular weight in the range of from 200 to 800, preferably from 200 to 600, and a double bond content of from 0.1 to 0.5 and preferably from 0.15 to 0.45 gram equivalents of C=C double bonds per 100 grams of polyester.

These polyhydroxyl compounds (a) have a viscosity at 25° C of from 0.2 to 500 poises, and preferably from 5 to 300 poises. Their double bond content may be determined in accordance with DIN 16 945, sheet 13. All figures quoted in this respect denote the number of gram equivalents of C=C double bonds per 100 g.

The unsaturated polyhydroxy polyesters required for the process according to the invention are preferably polyesters of olefinically unsaturated polycarboxylic acids or polycarboxylic acid anhydrides with, in either case, from 4 to 10 carbon atoms, such as maleic acid, maleic acid anhydride, fumaric acid, itaconic acid, zitraconic acid and tetrahydrophthalic acid, and excess quantities of polyhydric aliphatic alcohols and/or polyether alcohols with preferably from 2 to 17 carbon atoms, such as ethylene glycol, diethylene glycol, triethylene glycol, octa-ethylene glycol, 1,2-propanediol, 1,3-propanediol, dipropylene glycol, tripropylene glycol, 1,6-hexanediol, 1,2-dimethyl-1,3-propanediol, 2,5-dimethyl-2,5-hexanediol, 1,4-bis-hydroxyethylbenzene, 1,4-dihydroxy cyclohexane, 4,4'-bis-hydroxyethyl diphenyl dimethylmethane, trimethylolpropane, pentaerythritol and reaction products of the aforementioned ether-group-free alcohols with 1,2-epoxides, such as ethylene oxide or propylene oxide. Instead of using the aforementioned alcohols, it is also possible to use the corresponding anhydrides, i.e., the corresponding cyclic ethers, especially the corresponding 1,2-epoxides.

Low molecular weight polyols, i.e., polyols with a molecular weight below 400, include the low molecular weight compounds mentioned above as starting materials for the production of the polyesters.

Regardless of the specific polyhydroxyl component used, the component must possess the aforementioned requirements in regard to hydroxyl number, molecular weight and double bond content.

The olefinically unsaturated monomers (b) used in the process according to the invention include any organic compounds containing olefinic double bonds with no more than one isocyanate-reactive group and which boil at temperatures in the range of from 40° to 250° C. Examples of such compounds include styrene, methylstyrene, divinylbenzene, methylacrylate, methylmethacrylate, butylacrylate, butylmethacrylate, acrylonitrile diallylphthalate, vinyl acetate, vinyl chloride, 2-hydroxy propylacrylate, 2-hydroxypropylmethacrylate and the like. Styrene is preferably used as unsaturated monomer (b).

Polyisocyanates suitable for use in the process according to the invention include essentially any organic polyisocyanate known and/or used in polyurethane chemistry. Examples include, tolylene diisocyanate, diphenylmethane diisocyanate, hexamethylene diisocyanate, trimethylhexamethylene diisocyanate and isophorone diisocyanate. It is also possible to use prepolymers containing isocyanate groups which are obtained (1) from diisocyanates and polyhydric alcohols by attachment through urethane bonds, (2) from diisocyanates and water by attachment through biuret bonds or (3) from diisocyanates by attachment through isocyanurate groups. Examples of prepolymers of this type containing isocyanate groups include the product formed from 3 mols of tolylene diisocyanate and 1 mol of trimethylolpropane, the biuret formed from 3 mols of hexamethylene diisocyanate and 1 mol of water, and the polyisocyanate containing isocyanurate groups obtainable in known manner from 2,4-diisocyanato toluene (see e.g. U.S. Pat. No. 3,645,979). It is preferred in the process according to the invention to use the known phosgenation products of aniline-formaldehyde condensates of which from 40 to 80% by weight, generally consists of diisocyanato diphenylmethane isomers and from 60 to 20% by weight of higher nuclear polyisocyanates of the diphenylmethane series.

The quantitative ratios in which polyisocyanates, unsaturated polyesters and copolymerizable monomers are used may fluctuate within wide limits and are governed by the properties required of the mixtures and by the properties required of the crosslinked polyurethanes.

In general, the quantitative ratios between the reactants are selected in such a way that the reaction mixture contains from 0.3 to 5 preferably from 0.8 to 3 isocyanate groups per hydroxyl groups, and for every olefinic double bond of component (a) from 0.3 to 5 and preferably from 0.5 to 3, double bonds of component (b). Preferably from about 30 to about 500 parts by weight of component (b) and from about 10 to about 500 parts by weight of component (c) are used in combination with 100 parts by weight of component (a). In general, there is no need to use high temperatures in preparing the mixture. Accordingly, it is generally sufficient to mix the three constituents together at room temperature.

It may be advantageous, depending upon the reactivity of the compounds and in order to influence the pot life of the mixture and its hardening time, to use various additives in quantities of from 0.001 to 10% by weight, based on total weights of the mixture of the three main ingredients. Additives of this type include polymerization catalysts, such as benzoyl peroxide, dicumyl peroxide, t-butylcumyl peroxide and methylethylketone peroxide; polymerization accelerators such as amine, cobalt or vanadium salts; inhibitors, such as hydroquinone and t-butylpyrocatechol; and polyaddition catalysts, such as dimethylbenzyl amine, zinc naphthate and organo-tin compounds.

In the process according to the invention, the catalysts initiating the radical polymerization reaction, especially the known peroxide catalysts, are preferably used in quantities of from 0.001 to 6.0% by weight, based on the total quantity of the compounds present in the reaction mixture which react by polyaddition and/or polymerization.

As already mentioned, one of the advantages of the process according to the invention is the fact that large quantities, i.e. up to 400% by weight based on reactive components, of inert fillers may be added to the reaction mixture. Examples of fillers of this type include, quartz powder, chalk, aluminum oxide, aluminum oxide hydrated or even pigments such as titanium dioxide, iron oxide and the like. It is also possible to add to the reaction mixture plasticizers, such as dibutylphthalate; flameproofing agents, such as halogen-containing compounds and antimony trioxide; and reinforcing materials, such as glass fibers and glass cloths or mats.

It is also possible to add volatilizing inert liquids, such as fluorinated hydrocarbons or gas-releasing blowing agents, such as azodicarbonamide, and water in order to obtain cellular plastics. In this connection, it is also possible to add foam stabilizers, such as organo-silicon compounds.

It is also possible to add thermoplastic materials dissolved in organic solvents or thermoplastics in powder-form, including a solution of polyvinylacetate in styrene, or polyethylene powder, in order to obtain extremely fine-pored structures and to counteract reaction-induced shrinkage.

Water-binding additives such as sodium alumo silicate may also be used in order to bind even small quantities of water in cases where it is desired to obtain substantially bubble-free crosslinked polyurethanes.

Conversion of the mixtures of the described unsaturated polyesters, polyisocyanates and copolymerizable monomers, optionally in admixture with the aforementioned auxiliaries and additives, may be obtained by leaving them standing at room temperature or by heating them to elevated temperatures of up to about 220° C. Hardening may take a few minutes or a few hours, depending upon the reactivity of the mixture.

In order to obtain optimum properties in terms of dimensional stability to heat and resistance to solvents, it may be advantageous to subject the mixtures, after they have hardened, to a tempering treatment at elevated temperatures preferably at temperature of up to 250° C.

Normal atmospheric pressure may act on the mixtures both during hardening and also during tempering. It is also possible to apply excess pressure or reduced pressure. In many cases, it is favorable to harden the mixtures according to the invention by an injection molding process of the type described in German Offenlegungsschrift No. 2,017,506, in which short in-mold times are possible and bubble- and void-free moldings may be obtained. To this end, the liquid mixture is transferred under excess pressure, through a pipe into a mold which is at a higher temperature than the mixture, and remains in the mold under the pressure transmitted by the liquid mixture in the pipe, or under a higher pressure, until it hardens.

It is also possible to interrupt conversion of the liquid mixtures into crosslinked polyurethanes at any time and to continue it at some later stage, optionally with further shaping. The reaction may be interrupted for example, at a stage where the reaction product is solid or highly viscous at room temperature and may still be formed or shaped under the application of heat and pressure. This procedure is particularly recommendable for the processing of molding compositions and for the production of laminates and resin mats.

The crosslinked polyurethanes according to the invention are suitable for numerous practical applications. For example, moldings may be produced by casting in molds. The products herein may also be used for embedding a variety of different materials, such as metal, glass and plastics. They may also be used for making bonds, coatings and coverings. By virtue of their favorable electrical insulating properties, the crosslinked polyurethanes according to the invention may be used for producing insulating materials and components for use in electrical engineering, such as insulators, switch components, impregnations and the like. Other applications include foams, for example, for heat insulation, and binders for foundry sands. The crosslinked polyurethanes are also suitable for consolidating geological formations, such as, coal and rock, and may be used as consolidating compositions in mining, tunnelling, dam construction and other building projects.

It is particularly surprising that it is possible by the process according to the invention to produce plastics which, in addition to a high Martens degree, show outstanding flexural strength and extremely good impact strength, because it is a generally known fact that a high level of heat stability obtained by increasing crosslinked density is often accompanied by an increase in the brittleness of the plastics.

EXAMPLE 1

0.02 parts by weight of hydroquinone and 45 parts by weight of styrene were added to 110 parts by weight of an unsaturated polyester obtained by high-temperature esterification from maleic acid anhydride and 1,2-propane diol, with a viscosity of 22,000 cP at 25° C, an OH-number of 212, an acid number of 2.5, a molecular weight of 530 and a double bond content of 0.43. The resulting styrene solution with a styrene content of 29% had a viscosity of 95 cP at 25° C which substantially corresponded to 1/20th of the viscosity normally measured in styrene solutions of unsaturated polyesters. 12 parts by weight of fluorotrichloromethane, 4 parts by weight of a cobalt naphthenate solution in styrene containing 1% of cobalt, 2 parts by weight of dibutyl tin dilaurate and 1 part by weight of a standard commercial polysiloxane foam stabilizer were added to the solution. The stabiliser had the formula

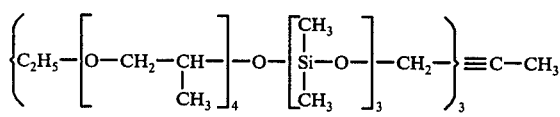

In a second vessel, 100 parts by weight of an isocyanate obtained by phosgenating an aniline-formaldehyde condensate, of which more than 50% consisted of diphenylmethane diisocyanate isomers and which had an NCO content of 31% and a viscosity of 130 cP at 25° C were mixed with 6 parts by weight of a 40% solution of methylethyl ketone peroxide in dimethylphthalate.

The two liquids were combined and vigorously stirred at room temperature. A homogeneous, initially very thin liquid was obtained, which foamed, after about 30 seconds, to 15 times its volume, which foaming was accompanied by the evolution of heat, and which liquid solidifed in the form of a foam. After cooling to room temperature, the hard foam obtained was transferred to a heating cabinet, and the temperature adjusted to 200° C. After 5 hours, the heating cabinet was opened and, by indenting the hard article, it was found that the hardness of the foam at the high temperature was substantially the same as at room temperature.

EXAMPLE 2

85 parts by weight of the unsaturated polyester described in Example 1 were stirred with 65 parts by weight of styrene and 0.02 parts by weight of hydroquinone. 100 parts by weight of the polyisocyanate described in Example 1, 10 parts by weight of a paste of 50% by weight of castor oil and 50% by weight of dried sodium alumo silicate, 5 parts by weight of a paste of 50% by weight of benzoyl peroxide and 50% of dibutylphthalate, and 450 parts by weight of quartz powder, were then added with stirring. A cast resin composition with a processing time of 4 hours at room temperature was obtained.

In order to remove the air bubbles that had been stirred into it, the cast resin composition was stirred for 10 minutes in a vacuum of from 5 to 10 Torr. The cast resin composition was then poured into a metal mold heated to 80° C for the production of panels. After 5 hours, the mold was opened and a homogeneous, bubble- and void-free plastics panel was obtained. In order to complete hardening, the panel was tempered for 15 hours at 200° C in a heating cabinet. The material was characterized by the following properties:

| | | |
|---|---|---|
| Elasticity modulus: | 102,300 kp/cm$^2$ | (DIN 7735) |
| Flexural strength: | 1,400 kp/cm$^2$ | (DIN 53 452) |
| Dimensional stability to heat, Martens degree: | 198° C | (DIN 53 458) |
| Impact strength: | 8 kp/cm$^2$ | (DIN 53 453) |

EXAMPLE 3

73 parts by weight of styrene and 0.04 parts by weight of hydroquinone were added to 110 g of an unsaturated polyester, obtained by high-temperature esterification of maleic acid anhydride and diethylene glycol, with an OH-number of 317, an acid number of 5.1, a viscosity of 4500 cP at 25° C, a molecular weight of 350 and a double bond content of 0.34. A solution with a styrene content of 40% and viscosity of 20 cP at 25° C was obtained.

20 parts by weight of a paste of equal parts of castor oil and sodium alumo silicate, 6 parts by weight of a paste of equal parts of benzoyl peroxide and dibutylphthalate, 520 parts by weight of quartz powder and 100 parts by weight of the polyisocyanate described in Example 1, were then added to the resulting solution. The liquid mass obtained was stirred for 5 minutes. It reacted very quickly, accompanied by spontaneous heating.

By pouring the liquid onto substrates, it was possible to produce quick-hardening coatings which had a hard, glossy surface and which were highly resistant to solvents and chemicals.

Plastics panels with the following properties were obtained in accordance with Example 2:

| | | |
|---|---|---|
| Elasticity modulus: | 90,100 kp/cm² | (DIN 7735) |
| Flexural strength: | 1,700 kp/cm² | (DIN 53 452) |
| Tensile strength: | 850 kp/cm² | (DIN 53 455) |
| Dimensional stability to heat: | 97° C | (DIN 53 458) |
| Impact strength: | 14 kpcm/cm² | (DIN 53 453) |

When plastics panels were produced in the same way from the same mixture, but without any quartz powder, the following properties were measured:

| | |
|---|---|
| Elasticity modulus: | 29,400 kp/cm² |
| Flexural strength: | 1,520 kp/cm² |
| Tensile strength: | 740 kp/cm² |
| Dimensional stability to heat: | 90° C |
| Impact strength: | 26 kpcm/cm² |

EXAMPLE 4

80 parts by weight of styrene and 0.03 parts by weight of hydroquinone were added to 90 parts by weight of an unsaturated polyester, obtained by high-temperature esterification of maleic acid anhydride and 1,2-propanediol, with an OH-number of 320, an acid number of 7.5, a viscosity of 6300 cP at 25° C, a molecular weight of 290 and a double bond content of 0.42. A styrene solution with a styrene content of 47% and a viscosity of 12 cP at 25° C was obtained.

10 parts by weight of a paste of equal parts of castor oil and sodium alumo silicate, 5 parts by weight of a paste of equal parts of benzoyl peroxide and dibutylphthalate, 100 parts by weight of the isocyanate mentioned in Example 1 and 570 parts by weight of quartz powder, were added to the resulting solution. After stirring for 5 minutes in a vacuum of from 5 to 10 Torr, a cast resin composition with a processing time of 3 hours was obtained.

Panels with the following properties were produced in accordance with Example 2:

| | | |
|---|---|---|
| Elasticity modulus: | 11,800 kp/cm² | (DIN 7735) |
| Flexural strength: | 1,500 kp/cm² | (DIN 53 452) |
| Impact strength: | 9 kpcm/cm² | (DIN 53 453) |
| Dimensional stability to heat, Martens degree: | 139° C | (DIN 53 458) |
| Tensile strength: | 1,100 kp/cm² | (DIN 53 455) |

When the plastics panels were produced in the same way from the same mixture, but without quartz powder, the following results were obtained:

| | |
|---|---|
| Elasticity modulus: | 34,800 kp/cm² |
| Flexural strength: | 1,300 kp/cm² |
| Impact strength: | 13 kpcm/cm² |
| Dimensional stability to heat, Martens degree: | 115° C |
| Tensile strength: | 920 kp/cm² |

EXAMPLE 5

126 parts by weight of an unsaturated polyester, obtained by high-temperature esterification of maleic acid anhydride and dipropylene glycol, with an OH-number of 325, an acid number of 10.1 and a viscosity of 1030 cP at 25° C, a molecular weight of 360 and a double bond content of 0.29, were stirred with 60 parts by weight of styrene and 0.03 parts by weight of hydroquinone. A solution of the unsaturated polyester containing 32% of styrene with a viscosity of 25 cP at 25° C was obtained.

100 parts by weight of the polyisocyanate described in Example 1, 15 parts by weight of a paste of equal parts of sodium alumo silicate and castor oil, 5 parts by weight of a paste of equal parts of benzoyl peroxide and dibutylphthalate and 575 parts by weight of quartz powder were then added. The cast resin composition was stirred in vacuo for 5 minutes. Thereafter, it had a processing time of more than 3 hours.

The composition was poured into a steel mold for the production of a 10 kV supporting insulator with cast-in brass fittings. The steel mold had a temperature of 80° C. After 3 hours, the supporting insulator was removed from the mold and tempered for 15 hours at 130° C. It showed a favorable electrical insulating effect. For a length of 130 mm, the breakdown voltage amounted to 75 kV and the cantilever force to 750 kp. The insulator was free from partial discharge phenomena up to test voltages of 25 kV.

EXAMPLE 6

130 parts by weight of an esterification product obtained by high-temperature esterification of 2.1 mols of 1,3-butanediol and 1 mol of maleic acid anhydride, with an OH-number of 418, an acid number of 16, a viscosity of 1260 cP at 25° C a molecular weight of 275 and a double bond content of 0.38, 100 parts by weight of styrene and 0.04 parts by weight of hydroquinone were stirred at room temperature. The solution had a viscosity of 18 cP at 25° C.

The solution was mixed with 125 parts by weight of a mixture of 60% of 2,4'- and 40% of 4,4'-diisocyanato diphenylmethane which had a viscosity at 25° C of 60 cP and an NCO content of 33.7% and then with 6.5 parts by weight of t-butylcumyl peroxide.

The solution was mixed in a kneader with 350 parts by weight of quartz powder, 10 parts of dried sodium alumo silicate of the zeolite type, 150 parts by weight of from 6 to 12 mm long glass fibers and 2 parts by weight of carbon black. A doughy, greasy molding composition suitable for immediate further processing was obtained. When left for about 24 hours, the molding composition had hardened to a considerable extent, although it was still workable at high temperatures under pressure.

Extremely hard, tough moldings were produced from the above molding composition after a period of 10 minutes in a heated steel mold at a temperature of 160° C and under a pressure of approximately 50 kp/cm². Post-hardening for 6 hours at 200° C left the moldings sound even at that temperature.

EXAMPLE 8

The conditions were the same as in Example 5, except that instead of the polyisocyanate mentioned in that Example, the same quantity of dimethyl diisocyanato diphenylmethane was used as the isomer mixture. The viscosity of the mixture obtained was substantially the same, and its processing time amounted to more than 8 hours. All the other measured properties of Example 5, especially the electrical and mechanical properties of the insulator, remained substantially the same.

EXAMPLE 9

100 parts by weight of the unsaturated polyester described in Example 6, of 1 mol of maleic acid anhydride and 2.1 moles of 1,3-butane diol, with an OH-number of 418, an acid number of 16, a viscosity of 1260 cP at 25° C, a molecular weight of 275 and a double bond content of 0.38, were mixed with 80 parts by weight of styrene, 10 parts by weight of a 50% sodium alumo silicate paste in castor oil, 3 parts by weight of t-butylcumyl peroxide and 145 parts by weight of an isocyanate prepolymer. The isocyanate prepolymer consisted of 93% of 3,3'-dimethyl-4,4'-diisocyanato diphenylmethane and 7% of dipropyleneglycol, and had an isocyanate content of 22% of NCO and a viscosity of 1500 cP at 25° C.

It was mixed with 480 parts by weight of quartz powder and 5 parts by weight of brown iron oxide, followed by evacuation with stirring for 8 minutes in a cast-resin treatment vessel under a pressure of 10 Torr. The cast resin composition thus obtained was poured into a pressure vessel connected to an injection nozzle provided with a valve. A pressure vessel was filled with compressed air at 5 atmospheres through a pipe extending through its cover. The injection nozzle was guided towards the lower end of a selfheated, hydraulically opening and closing mold which had a temperature of 120° C and whose cavity was disc-like in shape for the explosion chamber insert of an oil-filled circuit breaker for 20 kV.

After the valve in the injection nozzle had been opened, the cast resin composition flowed from the pressure vessel into the hot steel mold, while the air escaped through the narrow joint between the mold halves. After 4 minutes, the valve in the injection nozzle closed. The hydraulic mechanism then opened the mold from which the molding, weighing 170 g, was removed. It was bubble- and void-free, showed very little shrinkage (0.7%), was unaffected by switch oil both at room temperature and at 90° C, withstood static and dynamic (for example, impact-like) mechanical stressing and had a volume resistivity of more than $10^{15}$ Ohms. cm.

The cast resin composition in the pressure vessel underwent hardly any change in its viscosity over a period of 8 hours and, even after 24 hours, could still be further processed in the described installation.

What is claimed is:

1. A process for the production of crosslinked, urethane-containing plastics which consists essentially of reacting
   (a) at least one organic polyisocyanate,
   (b) at least one organic polyhydroxyl polyester having an average hydroxyl number of from 200 to 1000, an average molecular weight of from 200 to 800, and an average double band content of from 0.1 to 0.5 gram equivalents of C=C double bonds per 100 grams of said polyester, and
   (c) at least one olefinically unsaturated monomer having no more than one isocyanate-reactive group and having a boiling point of from 40° to 250° C, the amount of said monomer being such that for every olefinically unsaturated double bond in said polyester, there are from 0.3 to 5 olefinically unsaturated double bonds emanating from the monomer, the quantities of the reactants being chosen such that there are from 0.3 to 5 isocyanate groups present in the reaction mixture per hydroxyl group present.

2. The process of claim 1 wherein a catalyst or catalysts for initiating the polymerization reaction is included in the reaction mixture.

3. The process of claim 2, wherein said catalyst or catalysts are used in quantities of from 0.001 to 6.0 percent by weight, based on the total weight of the reaction mixture.

4. The process of claim 2, wherein said monomer is styrene.

5. The process of claim 1, wherein said monomer is styrene.

6. The process of claim 1, wherein the reaction contains from 0.8 to 3 isocyanate groups per hydroxyl group.

7. The process of claim 1, wherein from 0.5 to 3 double bonds of component (c) are present for every double bond present in component (b).

8. The process of claim 1 wherein a blowing agent is included in the reaction mixture.

9. The product produced by the process of claim 1.

* * * * *